(12) United States Patent
Ogura et al.

(10) Patent No.: US 8,967,559 B2
(45) Date of Patent: Mar. 3, 2015

(54) STAND MOUNTING STRUCTURE AND REAR CABINET

(75) Inventors: Kenji Ogura, Osaka (JP); Yuki Kita, Osaka (JP); Akihiro Fujikawa, Osaka (JP); Hideo Yonezawa, Osaka (JP); Tsukasa Fujimoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 366 days.

(21) Appl. No.: 12/841,542

(22) Filed: Jul. 22, 2010

(65) Prior Publication Data
US 2011/0043980 A1 Feb. 24, 2011

(30) Foreign Application Priority Data

Jul. 23, 2009 (JP) ................................. 2009-171785

(51) Int. Cl.
*F16M 11/00* (2006.01)
*F16M 11/04* (2006.01)
*F16M 11/16* (2006.01)
*F16M 11/22* (2006.01)

(52) U.S. Cl.
CPC ............. *F16M 11/00* (2013.01); *F16M 11/041* (2013.01); *F16M 11/16* (2013.01); *F16M 11/22* (2013.01); *F16M 2200/08* (2013.01); *Y10S 248/917* (2013.01); *Y10S 248/918* (2013.01)
USPC ........... 248/127; 248/121; 248/917; 248/918; 248/346.01

(58) Field of Classification Search
USPC ........ 248/688, 127, 371, 176.1, 188.1, 188.8, 248/188.9, 188.91, 346.01, 346.03, 121, 248/917, 918, 923, 177.1, 125.7, 676, 678, 248/466, 481, 185, 176.3
See application file for complete search history.

(56) References Cited

U.S. PATENT DOCUMENTS

| | | | | |
|---|---|---|---|---|
| 4,898,493 A | * | 2/1990 | Blankenburg | 403/326 |
| 6,775,151 B2 | * | 8/2004 | Suzuki | 361/788 |
| 6,905,103 B2 | * | 6/2005 | Kim | 248/398 |
| 7,072,175 B2 | * | 7/2006 | Ho | 361/679.21 |
| 7,361,046 B2 | * | 4/2008 | Drew | 439/353 |
| 7,455,267 B2 | * | 11/2008 | Kim | 248/65 |

(Continued)

FOREIGN PATENT DOCUMENTS

| | | |
|---|---|---|
| JP | H01 104497 U | 7/1989 |
| JP | 2006-173849 | 6/2006 |
| JP | 2009-038540 | 2/2009 |

OTHER PUBLICATIONS

EPO—European Patent Application No. EP 10 17 0445—Extended European Search Report—Dated Sep. 19, 2012.

*Primary Examiner* — Monica Millner
(74) *Attorney, Agent, or Firm* — Morgan, Lewis & Bockius LLP (57) ABSTRACT

This invention relates to a stand attachment structure for attaching a stand that supports a low-profile display unit, such as a liquid crystal display, in an upright position, and to a rear cabinet. In the rear cabinet (1), a stand mounting part (10) including a temporal fixing means (13) is provided to allow temporal fixation of a stand (5) to the rear cabinet (1). The stand mounting part (10) includes a hook (11) for retaining the stand (5) in a predetermined orientation, and a reinforcing rib (12) having functions of reinforcing the hook and of guiding an engagement tab (52) disposed on the stand (5) for insertion. Then, the stand (5) is temporarily fixed to a display unit (P) by engaging the engagement tab (52) disposed on the stand (5) with the hook (11), and finally secured to the display unit (P) with a set screw (B1) after temporal fixing.

8 Claims, 4 Drawing Sheets

(56) References Cited

U.S. PATENT DOCUMENTS

| | | | |
|---|---|---|---|
| 7,591,443 B2* | 9/2009 | Lee et al. | 248/158 |
| 7,607,621 B2* | 10/2009 | Cai et al. | 248/188 |
| 7,672,121 B2* | 3/2010 | Li et al. | 361/679.21 |
| 7,819,372 B2* | 10/2010 | Huang et al. | 248/346.01 |
| 7,839,626 B2* | 11/2010 | Chen et al. | 361/679.07 |
| 8,047,497 B2* | 11/2011 | Tai | 248/346.03 |
| 8,162,278 B2* | 4/2012 | Tai | 248/346.03 |
| 2003/0103092 A1* | 6/2003 | Byoun et al. | 345/866 |
| 2003/0230693 A1* | 12/2003 | Yen et al. | 248/346.3 |
| 2005/0098700 A1* | 5/2005 | Tien et al. | 248/346.01 |
| 2006/0289716 A1* | 12/2006 | Cai et al. | 248/371 |
| 2007/0008686 A1* | 1/2007 | Jang | 361/681 |
| 2007/0077793 A1* | 4/2007 | Ko | 439/101 |
| 2007/0290102 A1* | 12/2007 | Kim | 248/176.1 |
| 2009/0206222 A1* | 8/2009 | Huang et al. | 248/346.01 |

* cited by examiner

STAND MOUNTING STRUCTURE AND REAR CABINET

This application is based on Japanese Patent Application No. 2009-171785 filed on Jul. 23, 2009, the contents of which are hereby incorporated by reference.

BACKGROUND OF THE INVENTION

1. Field of the Invention

The present invention relates to a stand attachment structure for attaching a stand that supports a flat panel display unit, such as a liquid crystal display, in an upright position, and to a rear cabinet.

2. Description of Related Art

Conventionally, display apparatuses have been known, in which a liquid crystal module equipped with a liquid crystal panel and a drive unit is retained between a front cabinet and a rear cabinet to constitute a display unit, and a stand for holding the display unit in an upright position is attached to the display unit.

Such a stand is typically connected to a lower side or a back side of the display unit, and fixed with screws to a predetermined location on a casing (for example, a rear cabinet) which constitutes the display unit. In terms of easy fixing with the screws, it is preferable that the stand be temporarily fixed at a predetermined location of the display unit, and then secured with the screws. With this in view, a television receiver with a stand which can be fixed with screws after temporarily connecting an engaging piece section disposed on a stand side to an engaging hole section disposed on an attachment frame side has been already suggested (for example, in Japanese Patent Laid-Open Publication No. 2009-38540).

On the other hand, it is also possible to form a screw insertion hole in a rear cabinet, dispose, on an inner side of the rear cabinet, a retainer member which has a tapped hole, and secure an externally disposed stand member with screws. For example, a liquid crystal television set and a display apparatus are already suggested (for example, in Japanese Patent Laid-Open Publication No. 2006-173849), in which a hook is disposed on an inner surface side of the rear cabinet, and after the retainer member having a hook engaging hole is temporarily fixed to the hook, the stand member is installed from an external surface side of the rear cabinet, and subsequently secured with screws inserted from the screw insertion hole formed in the rear cabinet and screwed into the tapped hole formed in the retainer member.

There is another type of display apparatus including a display unit and a stand which are to be separately packed as individual components, thereby necessitating operation of a user who have purchased the display apparatus to assemble the display unit and the stand on his/her own. In this case, if the stand can be temporarily fixed at a predetermined location to the display unit, and then secured with screws, positioning and screwing can be facilitated, with a result that the user himself or herself can perform operation of attaching the stand easily and safely.

When the user who have purchased the display apparatus has to assemble the display unit and the stand, ease and safety in operation are particularly desired. In order to satisfy both the ease and safety in operation, it is preferable that, in addition to a capability of temporarily fixing and then securing the stand with the screws to a main body side, the hook member or other members in a temporal fixing part should be resistant to breakage, or temporarily fixing and subsequently screwing operation should be performed safely without the danger of squeezing a finger.

Although the televisions described in the above-noted Publications No. 2009-38540 and No. 2006-173849 are both configured to allow final fixation by means of the screws after temporal fixing operation, no measures to prevent a finger from being squeezed during assemble operation are devised in either of the televisions. Therefore, it cannot be said that the televisions are sufficiently safe in terms of the assemble operation performed by the user who has purchased the display apparatus.

Further, when the user performs the assembling, a way of attaching the lightweight stand member to the display unit placed on a table or the like is safer and easier than a way of securing the display unit placed on the stand.

For this reason, a method for attaching the stand to the display unit at a bottom which is transversely situated when the display unit is horizontally laid down is desirable. Then, it is further desirable that the stand can be temporarily fixed at a predetermined position for stand attachment in a predetermined orientation without inclining. Still further, it is also desirable that the temporarily fixed stand can be secured using the screws as it is temporarily fixed without the need to hold the stand in one hand.

Meanwhile, regarding the display unit of a type in which the liquid crystal module is retained in a casing composed of a front cabinet and a rear cabinet, it is desirable to dispose a stand mounting part on a bottom surface of the rear cabinet, and provide the stand mounting part with a temporal fixing means for temporarily fixing the stand in safe without the danger of squeezing a finger. Further, it is also desirable that operation of final fixing with the screws be readily achieved, and the temporal fixing means should resist to breakage.

SUMMARY OF THE INVENTION

The present invention, which was conceived in view of the above problems, aims to provide a stand attachment structure with which a stand can be temporarily fixed to a display unit with safe operation, and finally secured after the temporal fixing, to thereby allow easy and safe attachment of the stand, and also provide a rear cabinet including a stand mounting part which provides capabilities of temporarily fixing the stand, and of making operation of temporarily fixing and screwing the stand easy and reliable.

In order to attain the object set forth above, the present invention is characterized in that the stand attachment structure comprises a display unit incorporating a liquid crystal module, a front cabinet, and a rear cabinet, and including a stand mounting part provided with a temporal fixing means which is composed of a hook for retaining a stand in a predetermined orientation and a reinforcing rib having functions of reinforcing the hook and of guiding an engagement tab disposed on the stand for insertion, and the stand which is to be attached to the stand mounting part, and is equipped with the engagement tab to be engaged with the hook. In addition, with the stand attachment structure, the stand is temporarily fixed to the display unit by engaging the engagement tab with the hook and, after the temporal fixing, finally secured to the display unit with a screw.

In the above-described structure, the stand is temporarily fixed in the predetermined orientation to the stand mounting part of the display unit through the temporal fixing means composed of the hook and the reinforcing rib, which allows co-fastening of the stand to the display unit using a set screw after the temporal fixing, to thereby firmly secure the stand and the display unit. Further, the reinforcing rib which has the functions of reinforcing the hook and of guiding the engagement tab for insertion can facilitate operation of temporarily fixing the stand readily and safely without causing the hooks to be broken, leading to easy and safe attachment of the stand.

Further, the present invention is characterized in that, in the above-described stand attachment structure, a first screw insertion hole is also disposed on the stand mounting part in addition to the temporal fixing means, and the stand includes a base and a stand top protruding from the base, the stand top where a hook insertion part into which the hook can be inserted and a second screw insertion hole communicating with the first screw insertion hole are disposed in addition to the engagement tab. Then, after the stand top is fitted in the stand mounting part so as to engage the engagement tab with the hook and temporarily fixed thereto, the set screw is inserted through the first and second screw insertion holes to finally fix the stand with the set screw. With this structure, since the stand is temporarily fixed in the predetermined orientation to the stand mounting part of the display unit through the temporal fixing means composed of the hook and the reinforcing rib, the stand and the display unit can be co-fastened by means of the set screw after the temporal fixing to realize firm fixation therebetween. Therefore, attachment operation of the stand can be easily performed with the stand attachment structure.

Still further, the present invention is characterized in that, in the stand attachment structure as described above, a plurality of the reinforcing ribs are disposed along a direction of length of the hook in a form of comb teeth whose height is defined to be equal to the height of the hook and whose length is defined at a level adequate to prevent a human finger from making access to the stand mounting part, while adjacent ones of the reinforcing ribs are arranged at an interval adequate to prevent the human finger from making access thereto, and open slots into which the reinforcing ribs can be inserted are disposed in the form of comb teeth on the engagement tab whose entire length is defined to be equal to the length of the hook. With this structure, temporal fixing operation and screwing operation can be safely performed with no danger of causing the finger to be caught in a gap between the stand top and the stand mounting part or between the hook and the engagement tab.

Moreover, the present invention is characterized in that, with the stand attachment structure configured as described above, the stand is attached to the stand mounting part while causing the open slots to move along the reinforcing ribs, thereby engaging the engagement tab with the hook. With this structure, the stand can be attached to a predetermined location while causing the open slots on a stand side to move along the reinforcing ribs on a rear cabinet side, which makes it possible to safely and reliably perform the temporal fixing operation and the screwing operation with no danger of causing the finger to be squeezed during the operation.

Further, the present invention is characterized in that, in the stand attachment structure configured as described above, the stand mounting part is disposed at a bottom of the rear cabinet, a stand holder having a tapped hole communicating with the first screw insertion hole is disposed inside the unit on the stand mounting part, and the stand and the rear cabinet are co-fastened through the set screw to the stand holder for final fixation. With this structure, after the stand is temporarily fixed to the stand mounting part of the display unit in the predetermined orientation, the stand can be firmly fixed to the rear cabinet by co-fastening the stand to the stand holder with the set screw after the temporal fixing, which can facilitate operation of attaching the stand to the display unit.

Still further, the present invention is characterized in that the rear cabinet retains the liquid crystal module in conjunction with the front cabinet to constitute the display unit, and comprises the stand mounting part to which the stand for supporting the display unit in an upright position is attached, and the temporal fixing means which is disposed on the stand mounting part to temporarily fix the stand at the predetermined location in the predetermined orientation, and composed of a hook to which the engagement tab disposed on the stand is engaged to maintain the stand in the predetermined orientation, and the reinforcing rib having functions of reinforcing the hook and of guiding the engagement tab for insertion.

With this structure, since the stand is temporarily fixed in the predetermined orientation to the stand mounting part in the rear cabinet through the temporal fixing means composed of the hook and the reinforcing tab, it becomes possible to easily fix the stand with the set screw after the temporal fixing. In addition, the temporal fixing operation can be performed easily and safely without causing the hook to be broken since the reinforcing rib has the functions of reinforcing the hook and of guiding the engagement tab for insertion.

Moreover, the present invention is characterized in that, in the rear cabinet configured as described above, the stand mounting part is provided with a peripheral wall rib which surrounds an edge of the stand mounting part and the peripheral wall rib has a missing part of a length corresponding to the length of the hook in a region facing the reinforcing rib, and accordingly the stand mounting part is constructed as a resin molding in which the peripheral wall rib, the hook, and the reinforcing rib are integrally formed. With this configuration, since the rear cabinet, in which the hook including the reinforcing rib is disposed on the stand mounting part including the peripheral wall rib, can be integrally formed, it is possible to mass-manufacture the rear cabinet, leading to reduction in manufacturing costs.

Further, the present invention is characterized in that, in the rear cabinet configured as described above, a plurality of the reinforcing ribs are disposed along a direction of length of the hook in the form of the comb teeth whose height is defined to be equal to the height of the hook and whose length is defined at a level adequate to prevent the human finger from making access to the stand mounting part, and adjacent ones of the reinforcing ribs are arranged at an interval adequate to prevent the finger from making access thereto. With this configuration, the temporal fixing operation and the screwing operation can be performed in safety without the danger of causing the finger to be caught in the gap between the stand top and the stand mounting part or between the hook and the engagement tab during the temporal fixing operation and the screwing operation achieved by engaging the hook on the rear cabinet side with the engagement tab on the stand side.

DETAILED DESCRIPTION OF PREFERRED EMBODIMENT

Now, an embodiment of the present invention will be described with reference to the drawings. It should be noted that the same components are designated by the same reference numbers, and detailed descriptions related to the components will be omitted as appropriate.

Figure 1:
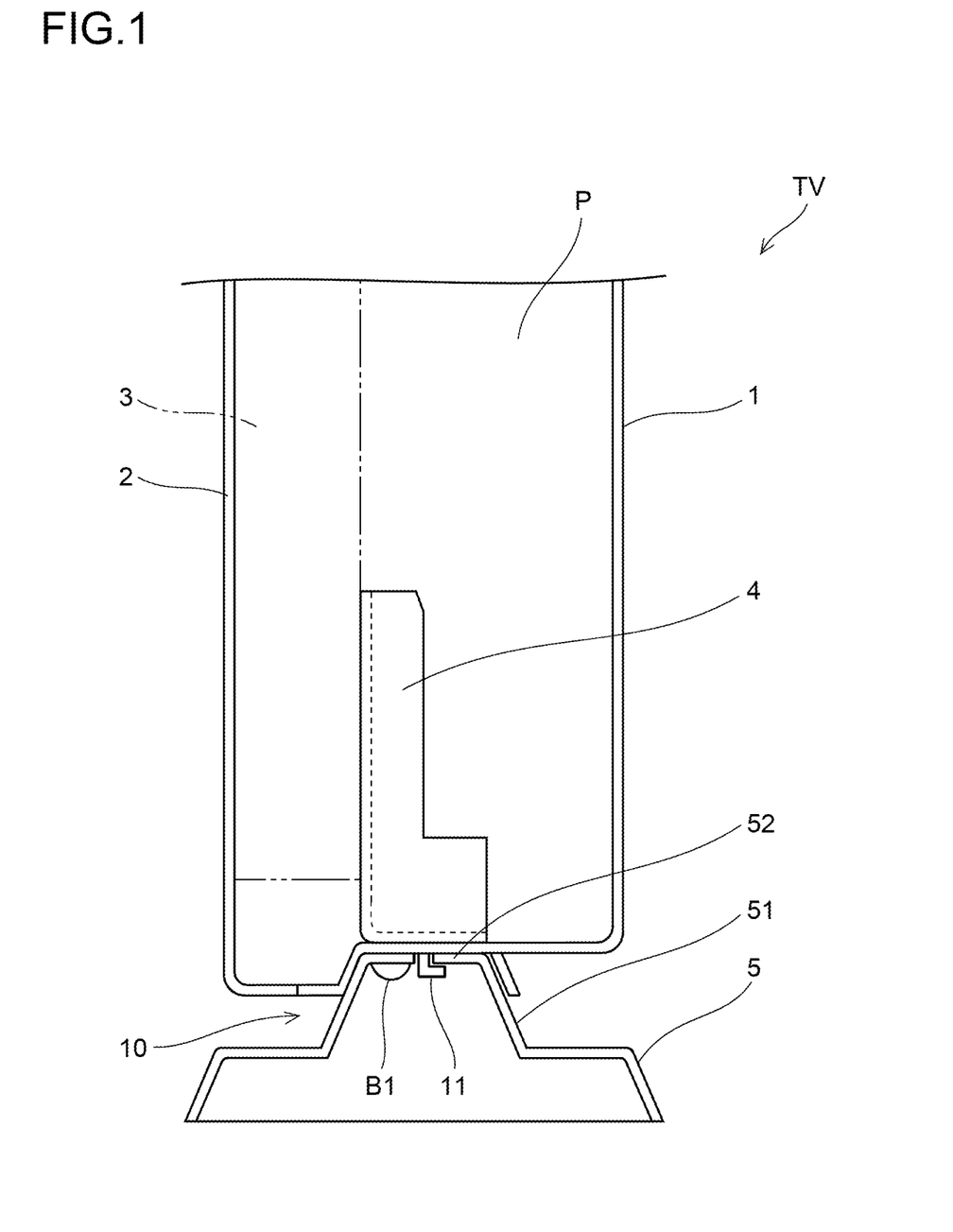
FIG. 1 is a general explanatory diagram showing a display apparatus having a stand attachment structure according to the present invention.

A stand attachment structure according to this embodiment is, for example, as shown in FIG. 1, a structure for attaching a stand 5 to a display unit P which includes a liquid crystal module 2, a front cabinet 3 and a rear cabinet 1. With the stand attachment structure, the stand 5 is attached by fitting the stand 5 in a stand mounting part 10 disposed on the display unit P, and an engagement tab 52 disposed on the stand 5 is engaged with a hook 11 disposed on the stand mounting part 10.

The stand mounting part 10, which may be disposed on any site in a casing for constituting the display unit P, is disposed at a bottom of the rear cabinet 1 in this embodiment. Accordingly, the rear cabinet 1 including the stand mounting part 10, the liquid crystal module 2, the front cabinet 3, and a stand holder 4 are assembled to constitute the display unit P, and the stand 5 is attached to the stand mounting part 10 to form a display apparatus TV into a single unit.

The stand 5 is composed of a base and a stand top 51 protruding from the base. The stand top 51, which is an attachment section to be fitted and attached to the stand mounting part 10 disposed on the rear cabinet 1, is fitted in the stand mounting part 10 formed on a bottom surface of the rear cabinet 1. Then, a set screw B1 is screwed into the stand holder 4 in order to co-fasten the stand 5 and the rear cabinet 1.

Figure 2A:
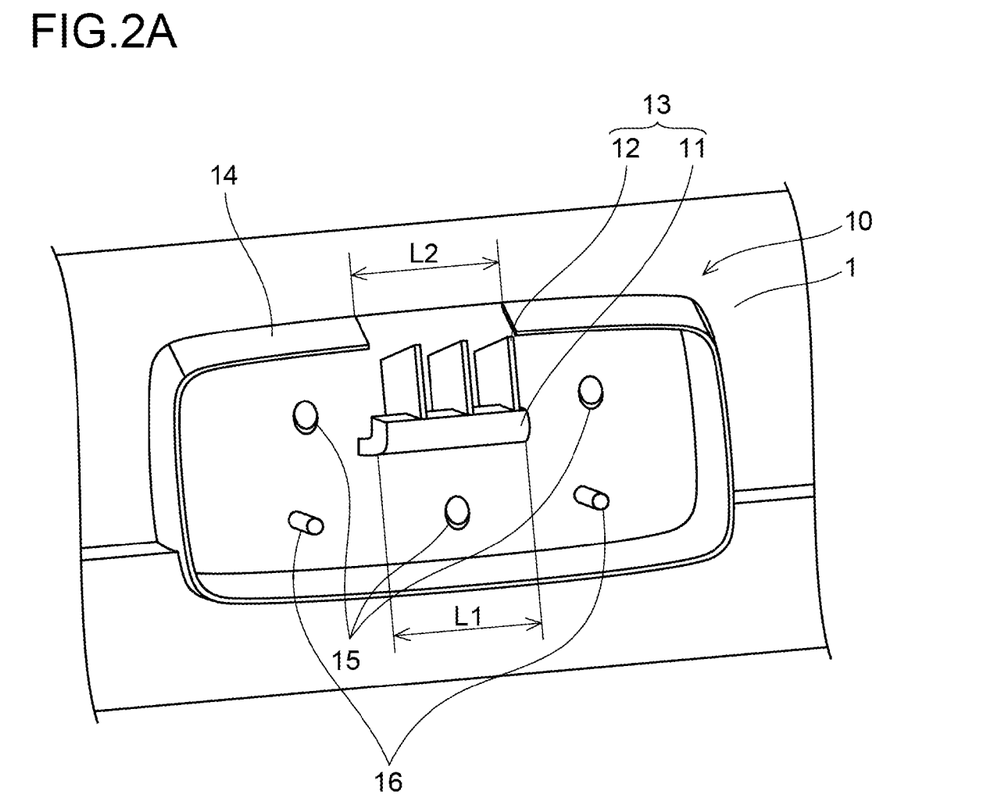
FIG. 2A is an enlarged explanatory diagram showing an overall perspective view of a stand mounting part.
Figure 2B:
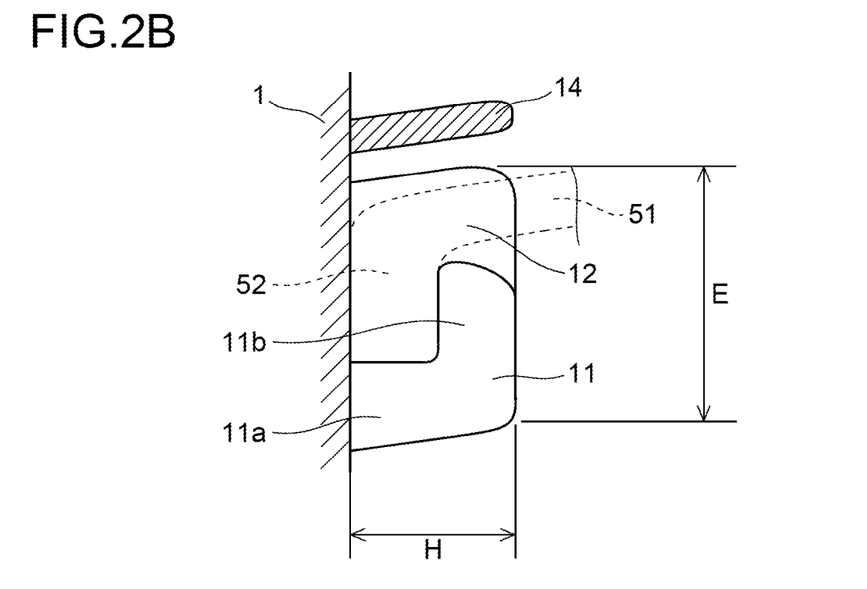
FIG. 2B is an enlarged explanatory diagram showing a side view of a main part in the stand mounting part.

Meanwhile, a temporarily fixed position is limited through engagement achieved by hooking the engagement tab 52 provided to the stand top 51 on the hook 11 provided to the stand mounting part 10. In addition, the engagement tab 52 is engaged along a reinforcing rib 12 (refer to FIG. 2) having both a function of reinforcing the hook 11 and a function of guiding the engagement tab 52 for its insertion, which allows the stand 5 to be attached easily and safely with the stand attachment structure.

Next, referring to FIG. 2, the stand mounting part 10 will be described in further detail.

As shown in FIG. 2A, the stand mounting part 10, which is disposed on the bottom surface of the rear cabinet 1, is formed into a concave shape or a shape surrounded by a peripheral wall rib 14. In addition, the stand mounting part 10 further includes a temporal fixing means 13 consisting of the hook 11 and the reinforcing rib 12, and also includes a plurality of first screw insertion holes 15 into which the set screws are inserted. Reference numeral 16 represents cylindrical guides used as positioning guides for fitting the above-described stand top 51 of the stand 5.

As shown in FIG. 2B, the hook 11 is formed, in cross section, into a shape of the letter L composed of a rising piece 11a protruded from a frame of the rear cabinet 1 and a bending piece 11b curved from an end of the rising piece 11a. The hook 11 has a function of retaining the stand 5 in a predetermined orientation through engagement achieved by hooking the engagement tab 52 provided to the stand 5 on the bending piece 11b. On the other hand, a plurality of the reinforcing ribs 12 are arranged along a direction of a length L1 of the hook 11, and has both a function of reinforcing the hook 11 and a function of guiding the engagement tab 52 for its insertion.

In addition to provision of the plurality of reinforcing ribs 12 (for example, three reinforcing ribs 12 as shown in FIG. 2A) arranged in the form of comb teeth along the length direction of the hook 11, a plurality of open slots 53 (refer to FIG. 3A) in which the reinforcing ribs 12 can be inserted are disposed also in the form of comb teeth on the engagement tab 52 whose entire length is defined to be equal to the length of the hook. Consequently, the engagement tab 52 can be engaged with the hook 11 by fitting the open slots 53 while causing the open slots 53 to move along the reinforcing ribs 12.

Figure 3A:
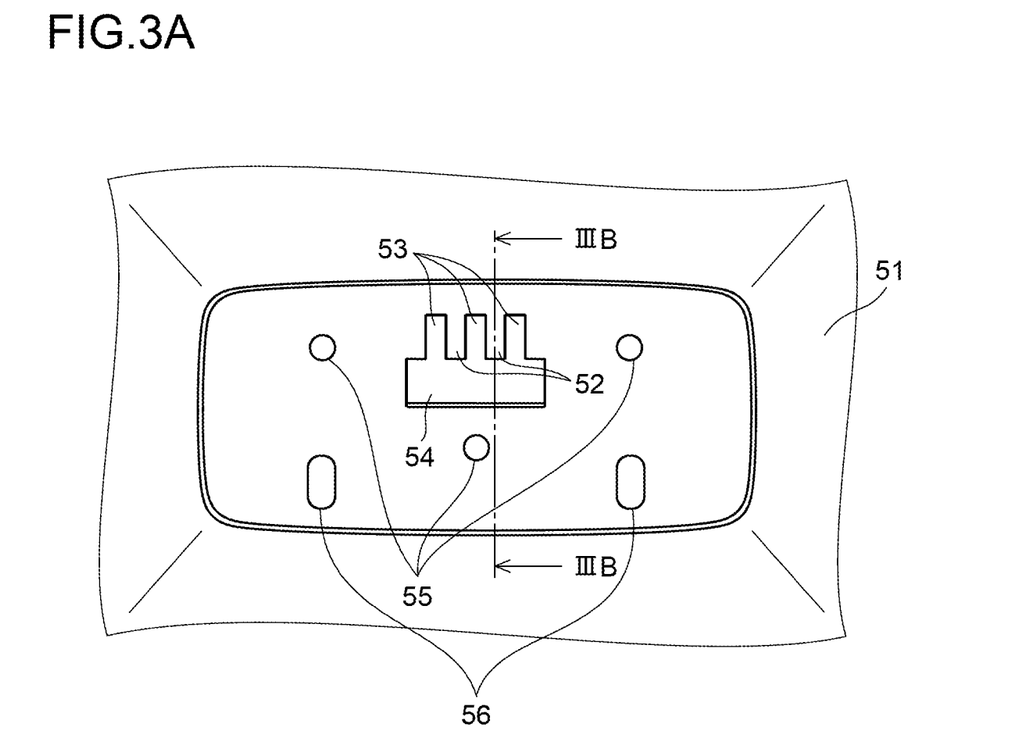
FIG. 3A is an enlarged explanatory diagram showing a plan view of a stand top.

As such, when both the engagement tabs 52 on a stand side and the hook 11 with the reinforcing ribs 12 on a rear cabinet side are designed in the form of the comb teeth to be engaged with each other, the engagement tab 52 can be engaged with the hook 11 in a firmly hooked state while being guided.

On the other hand, a height H of the reinforcing rib 12 is defined to be equal to the height of the hook 11, while a length E of the reinforcing rib 12 is defined at a level adequate to prevent a human finger from making access to the stand mounting part 10, in addition to arranging adjacent reinforcing ribs at an interval also adequate to prevent the human finger from making access thereto. With this structure, temporal fixing operation and screwing operation can be safely performed on the stand without a danger of causing the finger to be caught in a gap between the stand top where the engagement tab 52 is formed and the stand mounting part 10 or between the hook 11 and the engagement tab 52.

Meanwhile, the peripheral wall rib 14 is designed to have a partial missing length L2. The missing length L2 is slightly greater than the length L1 of the hook 11. Thus, even though the hook 11 and the reinforcing ribs 12 are provided in an inner region surrounded by the peripheral wall rib 14, an architecture to be integrally molded using upper and lower dies can be realized by designing the peripheral wall rib 14 so as to have a missing part of a length corresponding to the length L1 of the hook 11 in a region facing the hook 11 and the reinforcing ribs 12. Consequently, the rear cabinet 1 of a complicated geometry including the stand mounting part 10 can be manufactured with a resin molding as a single unit.

As has been described above, since the rear cabinet 1 on which the stand mounting part 10 including the temporal fixing means 13 composed of the hook 11 and the reinforcing rib 12 is disposed is integrally moldable, it becomes possible to mass produce the rear cabinet 1, which leads to reduction in cost of manufacturing the rear cabinet 1.

Next, referring to FIG. 3, the engagement tab 52 will be described in further detail.

As shown in FIG. 3A, the engagement tab 52 is shaped in the form of comb teeth with a large opening of a hook insertion part 54 and small openings of the plurality of open slots 53 formed at an end of the stand top 51. The hook insertion part 54 is the opening larger than the hook 11, and the hook 11 can be inserted therethrough, thereby allowing the stand top 51 to be fitted in the stand mounting part 10.

Reference numeral 55 represents second screw insertion holes which are communicating with the above-described first screw insertion holes 15 formed in the stand mounting part 10 when the stand 5 is temporarily fixed to the stand mounting part 10. As a result, the set screw B1 can be screwed passing through the first and second screw insertion holes 15 and 55 into a tapped hole of the above-described stand holder 4, to thereby co-fasten the stand 5 and the rear cabinet 1 to the stand holder 4.

Reference numeral 56 represents guide holes into which the above-described cylindrical guides 16 are inserted. The guide hole 56 is formed in the shape of an elongated hole in order to facilitate insertion operation for engaging the hook 11 and the engagement tab 52 with each other.

Figure 3B:
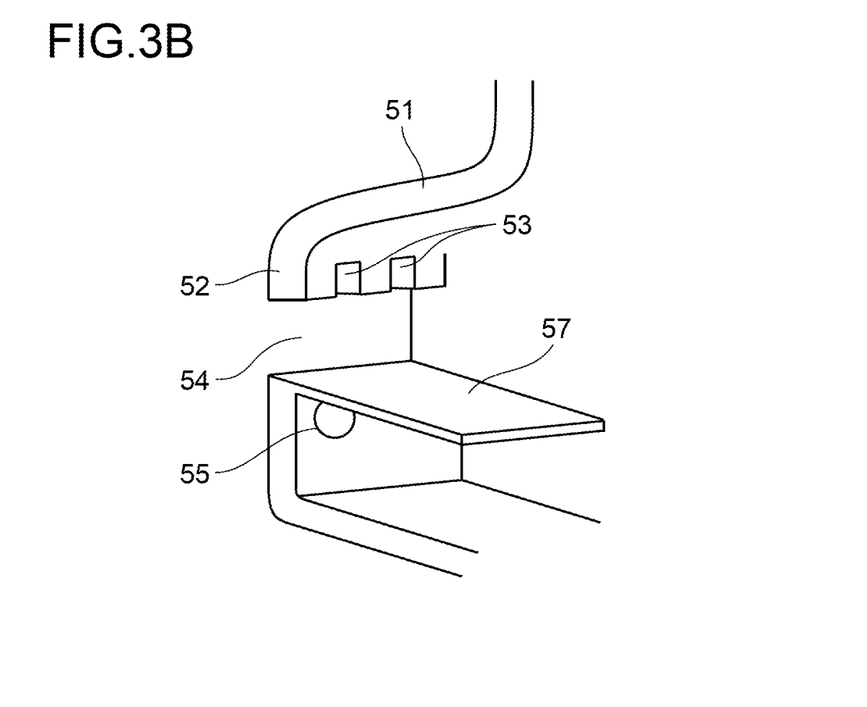
FIG. 3B is an enlarged explanatory diagram showing a cross-sectional perspective view of the stand top.

In addition, strengthening rib 57 is provided to an open edge of the hook insertion part 54 as shown in a cross sectional view of FIG. 3B (taken along a line III B-III B in FIG. 3A) in terms of increasing component strength in the vicinity of the hook insertion part 54 where a wide open area exists.

Thus, the stand 5 can be attached by engaging the engagement tab 52 formed on the stand top 51 with the hook 11 in the stand mounting part 10 disposed on the rear cabinet 1. On the other hand, since the engagement tab 52 is hooked on the hook 11, the stand 5 can be installed and temporarily fixed in the predetermined orientation to the display unit P in a condition where the display unit P is put into a sideways position.

The stand 5, which is temporarily fixed, as described above, in the predetermined orientation through the temporal fixing means 13 composed of both the hook 11 and the reinforcing ribs 12 to the stand mounting part 10 in the rear cabinet 1, can be easily secured with screws after it is temporarily fixed. In addition, since the reinforcing rib 12 has the functions of reinforcing the hook 11 and of guiding the engagement tab 52 for insertion, the temporal fixing operation can be performed easily and safely while preventing the hook 11 from breakage.

Figure 4A:
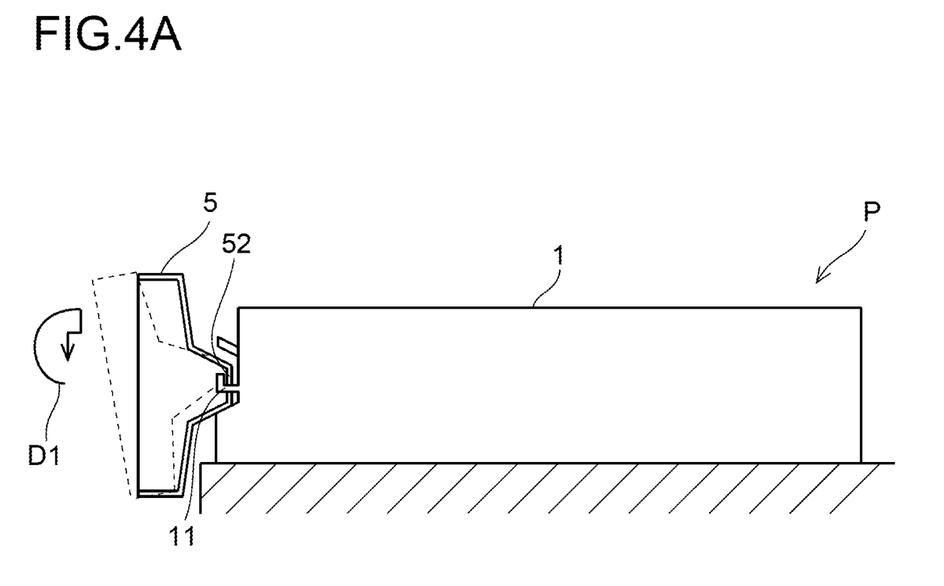
FIG. 4A is a general explanatory diagram showing a procedure of attaching a stand to a display unit in a temporarily fixed state.

For example, as shown in FIG. 4A, the display unit P is laid down on a table. In this case, the display unit P is placed with the rear cabinet 1 facing upward, so that the hook 11 is oriented in an up-pointing position. Operation of fitting the stand 5 in the display unit P is performed while turning the stand 5 along an operation path D1 indicated in FIG. 4A, and the engagement tab 52 is accordingly engaged with the hook 11 to temporarily fix the stand 5.

In view of the fitting operation performed while turning the stand 5 along the operation path D1, the stand top 51 is defined to become smaller than the stand mounting part 10, while the guide hole 56 is formed in the shape of the elongated hole in order to allow the thus-performed fitting operation.

Figure 4B:
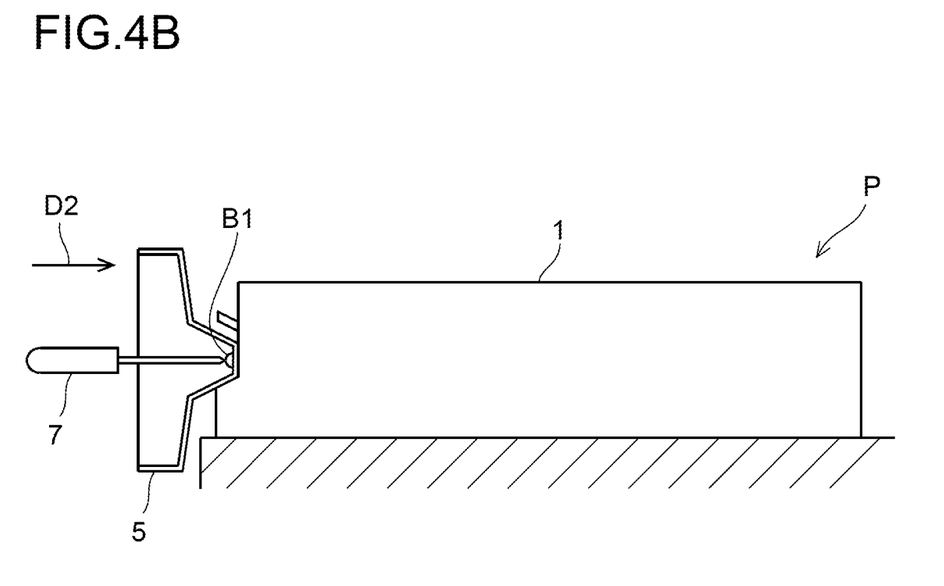
FIG. 4B is a general explanatory diagram showing the procedure of attaching the stand to the display unit in a state fixed with a screw.

Next, as shown in FIG. 4B, the set screw B1 is screwed and firmly tightened using a driver 7 while pushing the set screw B1 along an arrow direction D2 in the drawing. Since the tapped hole into which the set screw B1 is screwed and tightened is formed in the stand holder 4 used for fastening the liquid crystal module and the front cabinet that constitute the display unit P, the rear cabinet 1 and the stand 5 can be firmly fixed using the screw to the stand holder 4, which can ensure firm fixation of the stand 5 and the display unit P.

In the above-described stand attachment structure, including the engagement tab disposed on the stand top protruding from the base of the stand and the hook disposed on the stand mounting part in the rear cabinet, the engagement tab is engaged with the hook for temporal fixation, and the set screw is inserted from the second screw insertion hole on the stand side after the temporal fixation, and then, passing through the first screw insertion hole in the rear cabinet, screwed into the tapped hole of the rearward stand holder, to complete screw fixation.

In this way, the stand can be temporarily fixed to the display unit P for a time, and the stand and the rear cabinet can be co-fastened and firmly fixed using the set screw after the temporal fixing. Further, a need to hold the display unit P or the stand with a hand during screwing operation can be eliminated. Accordingly, attachment can be easily implemented with the stand attachment structure.

In the stand attachment structure configured as described above, the plurality of reinforcing ribs are disposed along the length direction of the hook in the form of comb teeth whose height is defined to be equal to the height of the hook and whose length is defined at a level adequate to prevent the human finger from making access to the stand mounting part, and the adjacent ones of the reinforcing ribs are arranged at the interval adequate to prevent the human finger from making access thereto. In addition, the open slots in which the reinforcing ribs can be inserted are also disposed in the form of comb teeth on the engagement tab whose entire length is defined to be equal to the length of the hook. With the thus-constructed stand attachment structure, the temporal fixing operation and screwing operation can be performed safely without the danger of causing the finger to be caught in the gap between the stand top and the stand mounting part or between the hook and the engagement tab.

Further, since the stand mounting part is provided with the peripheral wall rib which surrounds the edge of the stand mounting part and the peripheral wall rib has the missing part of the length corresponding to the length of the hook in the region facing the reinforcing rib, and accordingly the stand mounting part is constructed as the resin molding in which the peripheral wall rib, the hook, and the reinforcing rib are integrally formed, the rear cabinet, in which the hook including the reinforcing rib is disposed on the stand mounting part including the peripheral wall rib, can be mass-manufactured, which can contributes to reduction in manufacturing costs.

Moreover, since the stand mounting part is provided to the rear cabinet in this embodiment, the stand can be temporarily fixed in the predetermined orientation to the stand mounting part in the rear cabinet through the temporal fixing means composed of the hook and the reinforcing ribs. In addition, final fixation of the stand can be completed with ease and reliability by securing the stand with the screw after the temporal fixing. Further, since the reinforcing rib has the functions of reinforcing the hook and of guiding the engagement tab for insertion, it is possible to perform the temporal fixing operation easily and safely while preventing the hook from breakage.

Furthermore, the reinforcing ribs are arranged in the form of the comb teeth on the hook in order to further firmly reinforce the hook and allow protection of the finger from an incident that the finger is caught in the gap between the stand top and the stand mounting part or between the hook and the engagement tab, which can ensure safety in temporal fixing operation and screwing operation.

Although both the stand attachment structure for mounting the stand to the display unit including the liquid crystal module and the rear cabinet including the stand mounting part have been described above, the stand attachment structure according to the present invention may be applied to attaching a stand to a display unit equipped with any display screen other than the liquid crystal module. Alternatively, the stand attachment structure according to the present invention may be applied to any unit other than the display unit as long as the unit has construction obtained by assembling a main body and a stand.

As has been described above, according to the stand attachment structure of the present invention, the stand mounting part including the temporal fixing means composed of the hook and the reinforcing rib is disposed on the display unit, while the engagement tab is disposed on the stand. Then, the stand is temporarily fixed to the display unit by engaging the engagement tab with the hook, and, after the temporal fixation, finally secured to the display unit with the set screw, which can contribute to implementation of easy and reliable temporal fixing and screwing operation. Consequently, the stand attachment structure with which the stand can be attached with ease and safe can be obtained.

Further, according to the rear cabinet of the present invention, since the temporal fixing means composed of both the hook on which the engagement tab disposed on the stand is hooked to retain the stand in the predetermined orientation and the reinforcing rib having the functions of reinforcing the hook and of guiding the engagement tab for insertion is formed on the stand mounting part, the temporal fixing operation and the screwing operation can be performed easily and reliably. In this way, the rear cabinet to which the stand can be attached readily and safely can be obtained.

Thus, the stand attachment structure and the rear cabinet according to the present invention may be preferably applied to a display apparatus of such a type that a display unit and a stand are separately packed, and a user who has purchased the display apparatus needs to assemble the display unit and the stand by himself/herself.

1: Rear cabinet
2: Liquid crystal module
3: Front cabinet
4: Stand holder
5: Stand
10: Stand mounting part
11: Hook
12: Reinforcing rib
13: Temporal fixing means
14: Peripheral wall rib
15: First screw insertion hole
16: Cylindrical guide
51: Stand top
52: Engagement tab
53: Open slot
54: Hook insertion part
55: Second screw insertion hole

What is claimed is:

1. A stand attachment structure, comprising:
a display unit incorporating a liquid crystal module, a front cabinet, and a rear cabinet, and including a stand mounting part provided with a temporal fixing means, which is composed of a hook formed in cross section into an L shape provided with a rising piece provided on a bottom surface of the rear cabinet so as to protrude from the bottom surface of the rear cabinet, and a bending piece curved from an end of the rising piece away from the front cabinet in a direction perpendicular to a backside of the rear cabinet for retaining a stand in a predetermined orientation, and a reinforcing rib that reinforces the hook by being connected to a bent-side surface of the bending piece of the hook so as to be integrally coupled to the bottom surface of the rear cabinet and that guides insertion of an engagement tab formed on the stand, and
the stand, which has a base, and a stand top protruding from the base to be attached to the stand mounting part, and the stand top of which is equipped with the engagement tab where a hook insertion part allowing insertion of the hook and an open slit allowing insertion of the reinforcing rib are formed,
wherein the stand is temporarily fixed to the display unit by engaging the engagement tab to the hook to fit the stand top in the stand mounting part, and then finally fixed to the display unit with a set screw after temporal fixing.

2. The stand attachment structure according to claim 1, wherein:
in addition to the temporal fixing means, a first screw insertion hole is formed in the stand mounting part;
the stand top is provided with a second screw insertion hole communicating with the first screw insertion hole in addition to the engagement tab, and
the stand top is fitted and temporarily fixed to the stand mounting part by engaging the engagement tab with the hook, and then finally secured with the set screw inserted through the first and second screw insertion holes after temporal fixing.

3. The stand attachment structure according to claim 1, wherein:
a plurality of reinforcing ribs are disposed along a direction of length of the hook in a form of comb teeth whose height is defined to be equal to the height of the hook, and
open slots in which the reinforcing ribs can be inserted are arranged in the form of comb teeth on the engagement tab.

4. The stand attachment structure according to claim 3, wherein:
the engagement tab is engaged with the hook by attaching the stand to the stand mounting part while causing the open slots to move along the reinforcing ribs.

5. The stand attachment structure according to claim 2, wherein:
the stand mounting part is disposed at a bottom of the rear cabinet;
a stand holder having a tapped hole which communicates with the first screw insertion hole is disposed inside the unit on the stand mounting part, and
the stand and the rear cabinet are co-fastened to the stand holder through the set screw for final fixation.

6. A rear cabinet, wherein a liquid crystal module is retained in conjunction with a front cabinet to constitute a display unit, the rear cabinet comprising:
a bottom surface on which a stand mounting part is provided to which a stand for supporting the display unit in an upright position is attached, and
a temporal fixing means disposed on the stand mounting part to temporarily fix the stand at a predetermined position in a predetermined orientation, and composed of both a hook which is formed in cross section into an L shape provided with a rising piece provided on the stand mounting part so as to protrude from the bottom surface of the rear cabinet, and a bending piece curved from an end of the rising piece away from the front cabinet in a direction perpendicular to a backside of the rear cabinet, and to which an engagement tab disposed on the stand is hooked to retain the stand in the predetermined orientation, and a reinforcing rib that reinforces the hook by being connected to a bent-side surface of the bending piece of the hook so as to be integrally coupled to the bottom surface of the rear cabinet and that guides insertion of the engagement tab.

7. The rear cabinet according to claim 6, wherein:
the stand mounting part includes a peripheral wall rib surrounding an edge of the stand mounting part, the peripheral wall rib being configured to have a missing part of a length corresponding to a length of the hook in a region facing the reinforcing rib, thereby allowing the stand mounting part to be formed as a resin molding in which the peripheral wall rib, the hook, and the reinforcing rib are integrally molded.

8. The rear cabinet according to claim 6, wherein:
a plurality of the reinforcing ribs are disposed along a direction of length of the hook in a form of comb teeth whose height is defined to be equal to the height of the hook.

* * * * *